US008883902B2

(12) United States Patent
Tait et al.

(10) Patent No.: US 8,883,902 B2
(45) Date of Patent: Nov. 11, 2014

(54) AEROSOL DISPENSING SYSTEMS AND METHODS AND COMPOSITIONS FOR REPAIRING INTERIOR STRUCTURE SURFACES

(71) Applicant: Homax Products, Inc., Bellingham, WA (US)

(72) Inventors: William Stephen Tait, Madison, WI (US); John Kordosh, Simi Valley, CA (US); Steve Moore, Acworth, GA (US); Randy Hanson, Bellingham, WA (US)

(73) Assignee: Homax Products, Inc., Bellingham, WA (US)

( * ) Notice: Subject to any disclaimer, the term of this patent is extended or adjusted under 35 U.S.C. 154(b) by 0 days.

(21) Appl. No.: 13/732,274

(22) Filed: Dec. 31, 2012

(65) Prior Publication Data

US 2013/0112340 A1    May 9, 2013

Related U.S. Application Data

(63) Continuation of application No. 12/715,228, filed on Mar. 1, 2010, now Pat. No. 8,344,056, which is a continuation of application No. 12/080,687, filed on Apr. 4, 2008, now abandoned.

(60) Provisional application No. 60/922,041, filed on Apr. 4, 2007.

(51) Int. Cl.
| | | |
|---|---|---|
| *C08K 3/26* | (2006.01) | |
| *B29C 73/00* | (2006.01) | |
| *E04B 2/00* | (2006.01) | |
| *B65D 83/20* | (2006.01) | |
| *B65D 83/48* | (2006.01) | |

(52) U.S. Cl.
CPC . *B65D 83/48* (2013.01); *E04B 2/00* (2013.01); *B65D 83/206* (2013.01); *C09D 113/062* (2013.01)
USPC ............................................. 524/425; 156/94

(58) Field of Classification Search
USPC ........................................................ 524/425
See application file for complete search history.

(56) References Cited

U.S. PATENT DOCUMENTS

| | | |
|---|---|---|
| 208,330 A | 9/1878 | Palmer |
| 351,968 A | 11/1886 | Derrick |
| D25,916 S | 8/1896 | Woods |
| 568,876 A | 10/1896 | Regan |
| 579,418 A | 3/1897 | Bookwalter |
| 582,397 A | 5/1897 | Shone |
| 658,586 A | 9/1900 | Reiling |
| 930,095 A | 8/1909 | Seagrave |
| 931,757 A | 8/1909 | Harmer |
| 941,671 A | 11/1909 | Campbell |
| 1,093,907 A | 4/1914 | Birnbaum |
| 1,154,974 A | 9/1915 | Custer |
| 1,486,156 A | 3/1924 | Needham |
| 2,127,188 A | 8/1938 | Schellin et al. |
| 2,149,930 A | 3/1939 | Plastaras |
| D134,562 S | 7/1942 | Murphy |
| 2,307,014 A | 1/1943 | Becker et al. |
| 2,320,964 A | 6/1943 | Yates |
| 2,353,318 A | 7/1944 | Scheller |
| 2,388,093 A | 10/1945 | Smith |
| 2,530,808 A | 11/1950 | Cerasi |
| 2,565,954 A | 8/1951 | Dey |
| 2,612,293 A | 9/1952 | Michel |
| 2,686,652 A | 8/1954 | Carlson et al. |
| 2,723,200 A | 11/1955 | Pyenson |
| 2,763,406 A | 9/1956 | Countryman |
| 2,764,454 A | 9/1956 | Edelstein |
| 2,785,926 A | 3/1957 | Lataste |
| 2,790,680 A | 4/1957 | Rosholt |
| 2,831,618 A | 4/1958 | Soffer et al. |
| 2,839,225 A | 6/1958 | Soffer et al. |
| 2,908,446 A | 10/1959 | Strouse |

(Continued)

FOREIGN PATENT DOCUMENTS

| | | |
|---|---|---|
| CA | 770467 | 10/1967 |
| CA | 976125 | 10/1975 |

(Continued)

OTHER PUBLICATIONS

ASTM Designation: G61-86, Standard Test Method for Conducting Cyclic Potentiodynamic Polarization Measurements for Localized Corrosion Susceptibility of Iron-Nickel-, or Cobalt-Based Alloys, (Reapproved 1993), pp. 238-242, Philadelphia, PA.
Chadwick, "Controlling Particle Size in Self-Pressurized Aerosol Packages", Metal Finishing, Jul./Aug. 2004, vol. 102 No. 7/8.
Homax Products, Inc., "Easy Touch Spray Texture Brochure", Mar. 1992, 1 page.
Newman-Green, Inc., "Aerosol Valves, Sprayheads & Accessories Catalog", Apr. 1, 1992, pp. 14, 20, and 22.

(Continued)

*Primary Examiner* — Hui Chin
(74) *Attorney, Agent, or Firm* — Michael R. Schact; Schacht Law Office, Inc.

(57) ABSTRACT

A method of covering an anomaly in a wall substantially to match a pre-existing texture pattern surrounding the anomaly comprises the following steps. A valve is supported on a container assembly to define a main chamber. Contained material comprising wall material concentrate and propellant material is disposed within a main chamber defined by a valve and a container assembly. An actuator relative is arranged relative to the container assembly such that displacement of a button changes the valve from a closed configuration to an open configuration. A first portion of the contained material is applied to the anomaly. A second portion of the contained material is applied to the base coat. The second portion of the contained material forms a desired texture pattern on the base coat that substantially matches the pre-existing texture pattern.

17 Claims, 11 Drawing Sheets

(56) References Cited

U.S. PATENT DOCUMENTS

| | | |
|---|---|---|
| 2,932,434 A | 4/1960 | Abplanalp |
| 2,965,270 A | 12/1960 | Soffer et al. |
| 2,968,441 A | 1/1961 | Holcomb |
| 2,976,897 A | 3/1961 | Beckworth |
| 2,997,243 A | 8/1961 | Kolb |
| 3,083,872 A | 4/1963 | Meshberg |
| 3,107,059 A | 10/1963 | Frechette |
| 3,167,525 A | 1/1965 | Thomas |
| 3,191,809 A | 6/1965 | Schultz et al. |
| 3,196,819 A | 7/1965 | Lechner et al. |
| 3,198,394 A | 8/1965 | Lefer |
| 3,216,628 A | 11/1965 | Fergusson |
| 3,246,850 A | 4/1966 | Bourke |
| 3,258,208 A | 6/1966 | Greenebaum, II |
| 3,284,007 A | 11/1966 | Clapp |
| 3,314,571 A | 4/1967 | Greenebaum, II |
| 3,317,140 A | 5/1967 | Smith |
| 3,342,382 A | 9/1967 | Huling |
| 3,346,195 A | 10/1967 | Groth |
| 3,373,908 A | 3/1968 | Crowell |
| 3,377,028 A | 4/1968 | Bruggeman |
| 3,390,121 A | 6/1968 | Burford |
| 3,414,171 A | 12/1968 | Grisham et al. |
| 3,415,425 A | 12/1968 | Knight et al. |
| 3,425,600 A | 2/1969 | Abplanalp |
| 3,428,224 A | 2/1969 | Eberhardt et al. |
| 3,433,391 A | 3/1969 | Krizka et al. |
| 3,450,314 A | 6/1969 | Gross |
| 3,467,283 A | 9/1969 | Kinnavy |
| 3,472,457 A | 10/1969 | McAvoy |
| 3,482,738 A | 12/1969 | Bartels |
| 3,513,886 A | 5/1970 | Easter et al. |
| 3,514,042 A | 5/1970 | Freed |
| 3,544,258 A | 12/1970 | Presant et al. |
| 3,548,564 A | 12/1970 | Bruce et al. |
| 3,550,861 A | 12/1970 | Teson |
| 3,575,319 A | 4/1971 | Safianoff |
| 3,592,359 A | 7/1971 | Marraffino |
| 3,596,835 A | 8/1971 | Smith |
| 3,608,822 A | 9/1971 | Berthoud |
| 3,613,954 A | 10/1971 | Bayne |
| 3,648,932 A | 3/1972 | Ewald et al. |
| 3,653,558 A | 4/1972 | Shay |
| 3,698,645 A | 10/1972 | Coffey |
| 3,700,136 A | 10/1972 | Ruekberg |
| 3,703,994 A | 11/1972 | Nigro |
| 3,704,811 A | 12/1972 | Harden, Jr. |
| 3,704,831 A | 12/1972 | Clark |
| 3,705,669 A | 12/1972 | Cox et al. |
| 3,711,030 A | 1/1973 | Jones |
| 3,764,067 A | 10/1973 | Coffey et al. |
| 3,770,166 A | 11/1973 | Marand |
| 3,773,706 A | 11/1973 | Dunn, Jr. |
| 3,776,470 A | 12/1973 | Tsuchiya |
| 3,776,702 A | 12/1973 | Chant |
| 3,777,981 A | 12/1973 | Probst et al. |
| 3,788,521 A | 1/1974 | Laauwe |
| 3,795,366 A | 3/1974 | McGhie et al. |
| 3,799,398 A | 3/1974 | Morane et al. |
| 3,806,005 A | 4/1974 | Prussin et al. |
| 3,811,369 A | 5/1974 | Ruegg |
| 3,813,011 A | 5/1974 | Harrison et al. |
| 3,814,326 A | 6/1974 | Bartlett |
| 3,819,119 A | 6/1974 | Coffey et al. |
| 3,828,977 A | 8/1974 | Borchert |
| 3,848,778 A | 11/1974 | Meshberg |
| 3,862,705 A | 1/1975 | Beres et al. |
| 3,871,553 A | 3/1975 | Steinberg |
| 3,891,128 A | 6/1975 | Smrt |
| 3,912,132 A | 10/1975 | Stevens |
| 3,913,803 A | 10/1975 | Laauwe |
| 3,913,804 A | 10/1975 | Laauwe |
| 3,913,842 A | 10/1975 | Singer |
| 3,932,973 A | 1/1976 | Moore |
| 3,936,002 A | 2/1976 | Geberth, Jr. |
| 3,938,708 A | 2/1976 | Burger |
| 3,975,554 A | 8/1976 | Kummins et al. |
| 3,982,698 A | 9/1976 | Anderson |
| 3,989,165 A | 11/1976 | Shaw et al. |
| 3,991,916 A | 11/1976 | Del Bon |
| 3,992,003 A | 11/1976 | Visceglia et al. |
| 4,010,134 A | 3/1977 | Braunisch et al. |
| 4,032,064 A | 6/1977 | Giggard |
| 4,036,673 A | 7/1977 | Murphy et al. |
| 4,045,860 A | 9/1977 | Winckler |
| 4,089,443 A | 5/1978 | Zrinyi |
| 4,096,974 A | 6/1978 | Haber et al. |
| 4,117,951 A | 10/1978 | Winckler |
| 4,129,448 A | 12/1978 | Greenfield et al. |
| 4,147,284 A | 4/1979 | Mizzi |
| 4,148,416 A | 4/1979 | Gunn-Smith |
| 4,154,378 A | 5/1979 | Paoletti et al. |
| 4,164,492 A | 8/1979 | Cooper |
| RE30,093 E | 9/1979 | Burger |
| 4,171,757 A | 10/1979 | Diamond |
| 4,185,758 A | 1/1980 | Giggard |
| 4,187,959 A | 2/1980 | Pelton |
| 4,187,985 A | 2/1980 | Goth |
| 4,198,365 A | 4/1980 | Pelton |
| 4,202,470 A | 5/1980 | Fujii |
| 4,238,264 A | 12/1980 | Pelton |
| 4,258,141 A | 3/1981 | Jarre et al. |
| 4,275,172 A | 6/1981 | Barth et al. |
| 4,293,353 A | 10/1981 | Pelton et al. |
| 4,308,973 A | 1/1982 | Irland |
| 4,310,108 A | 1/1982 | Motoyama et al. |
| 4,322,020 A | 3/1982 | Stone |
| 4,346,743 A | 8/1982 | Miller |
| 4,354,638 A | 10/1982 | Weinstein |
| 4,358,388 A | 11/1982 | Daniel et al. |
| 4,370,930 A | 2/1983 | Strasser et al. |
| 4,372,475 A | 2/1983 | Goforth et al. |
| 4,401,271 A | 8/1983 | Hansen |
| 4,401,272 A | 8/1983 | Merton et al. |
| 4,411,387 A | 10/1983 | Stern et al. |
| 4,417,674 A | 11/1983 | Giuffredi |
| 4,438,221 A | 3/1984 | Fracalossi et al. |
| 4,442,959 A | 4/1984 | Del Bon et al. |
| 4,460,719 A | 7/1984 | Danville |
| 4,482,662 A | 11/1984 | Rapaport et al. |
| 4,496,081 A | 1/1985 | Farrey |
| 4,546,905 A | 10/1985 | Nandagiri et al. |
| 4,595,127 A | 6/1986 | Stoody |
| 4,609,608 A | 9/1986 | Solc |
| 4,641,765 A | 2/1987 | Diamond |
| 4,683,246 A | 7/1987 | Davis et al. |
| 4,702,400 A | 10/1987 | Corbett |
| 4,728,007 A | 3/1988 | Samuelson et al. |
| 4,744,495 A | 5/1988 | Warby |
| 4,761,312 A | 8/1988 | Koshi et al. |
| 4,792,062 A | 12/1988 | Goncalves |
| 4,793,162 A | 12/1988 | Emmons |
| 4,804,144 A | 2/1989 | Denman |
| 4,815,414 A | 3/1989 | Duffy et al. |
| 4,819,838 A | 4/1989 | Hart, Jr. |
| 4,830,224 A | 5/1989 | Brison |
| 4,839,393 A | 6/1989 | Buchanan et al. |
| 4,854,482 A | 8/1989 | Bergner |
| 4,870,805 A | 10/1989 | Morane |
| 4,878,599 A | 11/1989 | Greenway |
| 4,887,651 A | 12/1989 | Santiago |
| 4,893,730 A | 1/1990 | Bolduc |
| 4,896,832 A | 1/1990 | Howlett |
| D307,649 S | 5/1990 | Henry |
| 4,940,171 A | 7/1990 | Gilroy |
| 4,949,871 A | 8/1990 | Flanner |
| 4,953,759 A | 9/1990 | Schmidt |
| 4,954,544 A | 9/1990 | Chandaria |
| 4,955,545 A | 9/1990 | Stern et al. |
| 4,961,537 A | 10/1990 | Stern |
| 4,969,577 A | 11/1990 | Werding |
| 4,969,579 A | 11/1990 | Behar |
| 4,988,017 A | 1/1991 | Schrader et al. |
| 4,991,750 A | 2/1991 | Moral |

(56) References Cited

U.S. PATENT DOCUMENTS

| | | |
|---|---|---|
| 5,007,556 A | 4/1991 | Lover |
| 5,009,390 A | 4/1991 | McAuliffe, Jr. et al. |
| 5,037,011 A | 8/1991 | Woods |
| 5,038,964 A | 8/1991 | Bouix |
| 5,052,585 A | 10/1991 | Bolduc |
| 5,059,187 A | 10/1991 | Sperry et al. |
| 5,065,900 A | 11/1991 | Scheindel |
| 5,069,390 A | 12/1991 | Stern et al. |
| 5,083,685 A | 1/1992 | Amemiya et al. |
| 5,100,055 A | 3/1992 | Rokitenetz et al. |
| 5,115,944 A | 5/1992 | Nikolich |
| 5,126,086 A | 6/1992 | Stoffel |
| 5,169,037 A | 12/1992 | Davies et al. |
| 5,182,316 A | 1/1993 | DeVoe et al. |
| 5,188,263 A | 2/1993 | Woods |
| 5,188,295 A | 2/1993 | Stern et al. |
| 5,211,317 A | 5/1993 | Diamond et al. |
| 5,219,609 A | 6/1993 | Owens |
| 5,277,336 A | 1/1994 | Youel |
| 5,297,704 A | 3/1994 | Stollmeyer |
| 5,307,964 A | 5/1994 | Toth |
| 5,310,095 A | 5/1994 | Stern et al. |
| 5,312,888 A | 5/1994 | Nafziger et al. |
| 5,314,097 A | 5/1994 | Smrt et al. |
| 5,323,963 A | 6/1994 | Ballu |
| 5,341,970 A | 8/1994 | Woods |
| 5,368,207 A | 11/1994 | Cruysberghs |
| 5,374,434 A | 12/1994 | Clapp et al. |
| 5,405,051 A | 4/1995 | Miskell |
| 5,409,148 A | 4/1995 | Stern et al. |
| 5,417,357 A | 5/1995 | Yquel |
| D358,989 S | 6/1995 | Woods |
| 5,421,519 A | 6/1995 | Woods |
| 5,425,824 A | 6/1995 | Marwick |
| 5,450,983 A | 9/1995 | Stern et al. |
| 5,467,902 A | 11/1995 | Yquel |
| 5,476,879 A | 12/1995 | Woods et al. |
| 5,489,048 A | 2/1996 | Stern et al. |
| 5,498,282 A | 3/1996 | Miller et al. |
| 5,501,375 A | 3/1996 | Nilson |
| 5,505,344 A | 4/1996 | Woods |
| 5,523,798 A | 6/1996 | Hagino et al. |
| 5,524,798 A | 6/1996 | Stern et al. |
| 5,544,783 A | 8/1996 | Conigliaro |
| 5,548,010 A | 8/1996 | Franer |
| 5,549,228 A | 8/1996 | Brown |
| 5,558,247 A | 9/1996 | Caso |
| 5,562,235 A | 10/1996 | Cruysberghs |
| 5,570,813 A | 11/1996 | Clark, II |
| 5,573,137 A | 11/1996 | Pauls |
| 5,583,178 A | 12/1996 | Oxman et al. |
| 5,597,095 A | 1/1997 | Ferrara, Jr. |
| 5,615,804 A | 4/1997 | Brown |
| 5,639,026 A | 6/1997 | Woods |
| 5,641,095 A | 6/1997 | de Laforcade |
| 5,645,198 A | 7/1997 | Stern et al. |
| 5,655,691 A | 8/1997 | Stern et al. |
| 5,715,975 A | 2/1998 | Stern et al. |
| 5,727,736 A | 3/1998 | Tryon |
| 5,752,631 A | 5/1998 | Yabuno et al. |
| 5,775,432 A | 7/1998 | Burns et al. |
| 5,792,465 A | 8/1998 | Hagarty |
| 5,799,879 A | 9/1998 | Ottl et al. |
| 5,865,351 A | 2/1999 | De Laforcade |
| 5,887,756 A | 3/1999 | Brown |
| 5,894,964 A | 4/1999 | Barnes et al. |
| 5,915,598 A | 6/1999 | Yazawa et al. |
| 5,921,446 A | 7/1999 | Stern |
| 5,934,518 A | 8/1999 | Stern et al. |
| 5,941,462 A | 8/1999 | Sandor |
| 5,957,333 A | 9/1999 | Losenno et al. |
| 5,975,356 A | 11/1999 | Yquel et al. |
| 5,988,575 A | 11/1999 | Lesko |
| 6,000,583 A | 12/1999 | Stern et al. |
| 6,027,042 A | 2/2000 | Smith |
| 6,032,830 A | 3/2000 | Brown |
| 6,039,306 A | 3/2000 | Pericard et al. |
| 6,062,494 A | 5/2000 | Mills |
| 6,070,770 A | 6/2000 | Tada et al. |
| 6,092,698 A | 7/2000 | Bayer |
| 6,095,435 A | 8/2000 | Greer, Jr. et al. |
| 6,112,945 A | 9/2000 | Woods |
| 6,113,070 A | 9/2000 | Holzboog |
| 6,116,473 A | 9/2000 | Stern et al. |
| 6,129,247 A | 10/2000 | Thomas et al. |
| 6,131,777 A | 10/2000 | Warby |
| 6,152,335 A | 11/2000 | Stern et al. |
| 6,161,735 A | 12/2000 | Uchiyama et al. |
| 6,168,093 B1 | 1/2001 | Greer, Jr. et al. |
| 6,170,717 B1 | 1/2001 | Di Giovanni et al. |
| D438,111 S | 2/2001 | Woods |
| D438,786 S | 3/2001 | Ghali |
| 6,225,393 B1 | 5/2001 | Woods |
| 6,254,015 B1 | 7/2001 | Abplanalp |
| 6,257,503 B1 | 7/2001 | Baudin |
| 6,261,631 B1 | 7/2001 | Lomasney et al. |
| 6,265,459 B1 | 7/2001 | Mahoney et al. |
| 6,276,570 B1 | 8/2001 | Stern et al. |
| 6,283,171 B1 | 9/2001 | Blake |
| 6,284,077 B1 | 9/2001 | Lucas et al. |
| 6,290,104 B1 | 9/2001 | Bougamont et al. |
| 6,291,536 B1 | 9/2001 | Taylor |
| 6,296,155 B1 | 10/2001 | Smith |
| 6,296,156 B1 | 10/2001 | Lasserre et al. |
| 6,299,679 B1 | 10/2001 | Montoya |
| 6,299,686 B1 | 10/2001 | Mills |
| 6,315,152 B1 | 11/2001 | Kalisz |
| 6,325,256 B1 | 12/2001 | Liljeqvist et al. |
| 6,328,185 B1 | 12/2001 | Stern et al. |
| 6,328,197 B1 | 12/2001 | Gapihan |
| 6,333,365 B1 | 12/2001 | Lucas et al. |
| 6,352,184 B1 | 3/2002 | Stern et al. |
| 6,362,302 B1 | 3/2002 | Boddie |
| 6,375,036 B1 | 4/2002 | Woods |
| 6,382,474 B1 | 5/2002 | Woods et al. |
| 6,386,402 B1 | 5/2002 | Woods |
| 6,394,321 B1 | 5/2002 | Bayer |
| 6,394,364 B1 | 5/2002 | Abplanalp |
| 6,395,794 B2 | 5/2002 | Lucas et al. |
| 6,398,082 B2 | 6/2002 | Clark et al. |
| 6,399,687 B2 | 6/2002 | Woods |
| 6,414,044 B2 | 7/2002 | Taylor |
| 6,415,964 B2 | 7/2002 | Woods |
| 6,439,430 B1 | 8/2002 | Gilroy, Sr. et al. |
| 6,446,842 B2 | 9/2002 | Stern et al. |
| D464,395 S | 10/2002 | Huang |
| 6,474,513 B2 | 11/2002 | Burt |
| 6,478,198 B2 | 11/2002 | Haroian |
| 6,478,561 B2 | 11/2002 | Braun et al. |
| 6,482,392 B1 | 11/2002 | Zhou et al. |
| 6,510,969 B2 | 1/2003 | Di Giovanni et al. |
| 6,520,377 B2 | 2/2003 | Yquel |
| 6,531,528 B2 | 3/2003 | Kurp |
| 6,536,633 B2 | 3/2003 | Stern et al. |
| 6,581,807 B1 | 6/2003 | Mekata |
| 6,588,628 B2 | 7/2003 | Abplanalp et al. |
| 6,595,393 B1 | 7/2003 | Loghman-Adham et al. |
| 6,613,186 B2 | 9/2003 | Johnson |
| 6,615,827 B2 | 9/2003 | Greenwood et al. |
| 6,637,627 B1 | 10/2003 | Liljeqvist et al. |
| 6,641,005 B1 | 11/2003 | Stern et al. |
| 6,641,864 B2 | 11/2003 | Woods |
| 6,652,704 B2 | 11/2003 | Green |
| 6,659,312 B1 | 12/2003 | Stern et al. |
| 6,666,352 B1 | 12/2003 | Woods |
| 6,688,492 B2 | 2/2004 | Jaworski et al. |
| 6,712,238 B1 | 3/2004 | Mills |
| 6,726,066 B2 | 4/2004 | Woods |
| 6,736,288 B1 | 5/2004 | Green |
| 6,758,373 B2 | 7/2004 | Jackson et al. |
| 6,797,051 B2 | 9/2004 | Woods |
| 6,802,461 B2 | 10/2004 | Schneider |
| 6,831,110 B2 | 12/2004 | Ingold et al. |
| 6,832,704 B2 | 12/2004 | Smith |

(56) References Cited

U.S. PATENT DOCUMENTS

| | | | |
|---|---|---|---|
| 6,837,396 B2 | 1/2005 | Jaworski et al. |
| 6,843,392 B1 | 1/2005 | Walker |
| D501,538 S | 2/2005 | Zeng |
| D501,914 S | 2/2005 | Chen |
| 6,848,601 B2 | 2/2005 | Greer, Jr. |
| 6,851,575 B2 | 2/2005 | van't Hoff |
| D502,533 S | 3/2005 | Chen |
| 6,880,733 B2 | 4/2005 | Park |
| 6,883,688 B1 | 4/2005 | Stern et al. |
| 6,894,095 B2 | 5/2005 | Russo et al. |
| 6,905,050 B1 | 6/2005 | Stern et al. |
| 6,910,608 B2 | 6/2005 | Greer, Jr. et al. |
| 6,913,407 B2 | 7/2005 | Greer et al. |
| 6,926,178 B1 | 8/2005 | Anderson |
| 6,929,154 B2 | 8/2005 | Grey et al. |
| 6,932,244 B2 | 8/2005 | Meshberg |
| 6,966,467 B2 | 11/2005 | Di Giovanni et al. |
| D512,309 S | 12/2005 | Geier |
| 6,971,353 B2 | 12/2005 | Heinze et al. |
| 6,971,553 B2 | 12/2005 | Brennan et al. |
| 6,978,916 B2 | 12/2005 | Smith |
| 6,978,947 B2 | 12/2005 | Jin |
| 6,981,616 B2 | 1/2006 | Loghman-Adham et al. |
| 7,014,073 B1 | 3/2006 | Stern et al. |
| 7,014,127 B2 | 3/2006 | Valpey, III et al. |
| 7,036,685 B1 | 5/2006 | Green |
| 7,045,008 B2 | 5/2006 | Langford |
| 7,059,497 B2 | 6/2006 | Woods |
| 7,059,546 B2 | 6/2006 | Ogata et al. |
| 7,063,236 B2 | 6/2006 | Greer, Jr. et al. |
| 7,104,424 B2 | 9/2006 | Kolanus |
| 7,104,427 B2 | 9/2006 | Pericard et al. |
| 7,121,434 B1 | 10/2006 | Caruso |
| 7,163,962 B2 * | 1/2007 | Woods ............................ 516/11 |
| 7,182,227 B2 | 2/2007 | Poile et al. |
| 7,189,022 B1 | 3/2007 | Greer, Jr. et al. |
| 7,192,985 B2 | 3/2007 | Woods |
| 2001/0002676 A1 | 6/2001 | Woods |
| 2002/0003147 A1 | 1/2002 | Corba |
| 2002/0100769 A1 | 8/2002 | McKune |
| 2002/0119256 A1 | 8/2002 | Woods |
| 2003/0102328 A1 | 6/2003 | Abplanalp et al. |
| 2003/0134973 A1 | 7/2003 | Chen et al. |
| 2003/0183651 A1 | 10/2003 | Greer, Jr. |
| 2003/0205580 A1 | 11/2003 | Yahav |
| 2004/0012622 A1 | 1/2004 | Russo et al. |
| 2004/0099697 A1 | 5/2004 | Woods |
| 2004/0141797 A1 | 7/2004 | Garabedian et al. |
| 2004/0154264 A1 | 8/2004 | Colbert |
| 2004/0157960 A1 | 8/2004 | Rowe |
| 2004/0195277 A1 | 10/2004 | Woods |
| 2005/0121474 A1 | 6/2005 | Lasserre et al. |
| 2005/0161531 A1 * | 7/2005 | Greer et al. .................... 239/337 |
| 2005/0236436 A1 | 10/2005 | Woods |
| 2005/0256257 A1 | 11/2005 | Betremieux et al. |
| 2006/0049205 A1 | 3/2006 | Green |
| 2006/0079588 A1 | 4/2006 | Greer, Jr. |
| 2006/0180616 A1 | 8/2006 | Woods |
| 2006/0219808 A1 | 10/2006 | Woods |
| 2006/0219811 A1 | 10/2006 | Woods |
| 2006/0273207 A1 | 12/2006 | Woods |

FOREIGN PATENT DOCUMENTS

| | | |
|---|---|---|
| CA | 1191493 | 8/1985 |
| CA | 1210371 | 8/1986 |
| CA | 2145129 | 9/1995 |
| CA | 2090185 | 10/1998 |
| CA | 2291599 | 6/2000 |
| CA | 2381994 | 2/2001 |
| CA | 2327903 | 6/2001 |
| CA | 2065534 | 8/2003 |
| CA | 2448794 | 5/2004 |
| CA | 2504509 | 10/2005 |
| CA | 2504513 | 10/2005 |
| CH | 680849 | 11/1992 |
| DE | 210449 | 5/1909 |
| DE | 1926796 | 3/1970 |
| DE | 3808438 | 4/1989 |
| DE | 3806991 | 9/1989 |
| FR | 463476 | 2/1914 |
| FR | 84727 | 4/1964 |
| FR | 1586067 | 2/1970 |
| FR | 2659847 | 9/1991 |
| GB | 867713 | 5/1961 |
| GB | 977860 | 12/1964 |
| GB | 1144385 | 5/1969 |
| GB | 2418959 | 12/2006 |
| JP | 461392 | 1/1971 |
| JP | 8332414 | 6/1995 |
| WO | 9418094 | 8/1994 |

OTHER PUBLICATIONS

W. S. Tait, An Introduction to Electrochemical Corrosion Testing for Practicing Engineers and Scientists, 1994, Chapter 6, pp. 63-77, Pair O Docs Publications, Racine, WI.

* cited by examiner

AEROSOL DISPENSING SYSTEMS AND METHODS AND COMPOSITIONS FOR REPAIRING INTERIOR STRUCTURE SURFACES

RELATED APPLICATIONS

This application, U.S. patent application Ser. No. 13/732,274, is a continuation of U.S. patent application Ser. No. 12/715,228 filed Mar. 1, 2010.

U.S. patent application Ser. No. 12/715,228 is a continuation of U.S. patent application Ser. No. 12/080,687 filed Apr. 4, 2008, now abandoned.

U.S. patent application Ser. No. 12/080,687 claims priority of U.S. Provisional Patent Application Ser. No. 60/922,041 filed on Apr. 4, 2007.

The contents of all related applications listed above are incorporated herein by reference.

TECHNICAL FIELD

The present invention relates to systems, methods, and compositions for repairing interior structure surfaces such as walls and ceilings and, more particularly, to such systems, methods, and compositions adapted to form a spackle base and a paintable texture surface.

BACKGROUND

The surfaces of drywall materials defining wall and ceiling surfaces are commonly coated with texture materials. Texture materials are coatings that are deposited in discrete drops that dry to form a bumpy, irregular texture on the destination surface. Texture materials are commonly applied using a hopper gun connected to a source of pressurized air. However, when only a small area is to be coated or an existing textured surface is repaired, texture materials are typically applied using an aerosol dispensing system.

An aerosol dispensing system for dispensing texture material typically comprises a container assembly, a valve assembly, and an outlet assembly. The container assembly contains the texture material and a propellant material. The propellant material pressurizes the texture material within the container assembly. The valve assembly is mounted to the container assembly in a normally closed configuration but can be placed in an open configuration to define a dispensing path along which the pressurized texture material is forced out of the container assembly by the propellant material. Displacement of the outlet assembly places the valve assembly in the open configuration. The outlet assembly defines a portion of the outlet path and is configured such that the texture material is applied to the destination surface in an applied texture pattern.

The texture material dispensed by an aerosol dispensing system may employ a solvent base, a water base, or a base containing a combination of water and water soluble solvents. A solvent based texture material dries quickly but can be malodorous and may require the use of complementary solvent cleaners for clean up. A water based texture material is typically not malodorous and can be cleaned using water but can take significantly longer to dry. A water/solvent based texture material can be cleaned using water, is typically not unacceptably malodorous, and has a dry time somewhere between solvent based and water based texture materials.

The propellant used by aerosol dispensing systems for texture materials may simply be a compressed inert gas such as air or nitrogen. More typically, the propellant used by aerosol dispensing systems is a bi-phase propellant material, including mixtures of volatile hydrocarbons such as propane, n-butane, isobutane, dimethyl ether (DME), and methylethyl ether.

At room temperature, bi-phase propellant materials typically exist in both liquid and vapor states within the container assembly. Prior to use, the vapor portion of the bi-phase propellant material is pressurized to an equilibrium pressure. When the valve assembly is placed in its open configuration, the vapor portion of the bi-phase propellant material forces the texture material out of the container assembly along the dispensing path.

When the valve assembly returns to its closed position, part of the liquid portion of the bi-phase propellant material changes to the vapor state because of the drop in pressure within the container assembly. The vapor portion of the propellant material returns the pressure within the container assembly to the equilibrium value in preparation for the next time texture material is to be dispensed from the aerosol dispensing system.

To repair a hole in an existing wall, two functions are typically performed. First, a structural component is applied to form a bridge across the hole. Second, the structural component is coated substantially to match the coating on the wall surrounding the repair.

The need exists for systems, methods, and compositions that simplify the two-step process of repairing a hole in an existing wall.

SUMMARY

The present invention may be embodied as a method of covering an anomaly in a wall substantially to match a pre-existing texture pattern surrounding the anomaly, comprising the following steps. A container assembly is provided. A valve is supported on the container assembly to define a main chamber, where the valve operates in a closed configuration and an open configuration. Wall material concentrate is disposed within the main chamber, the wall material concentrate comprising 28.0-38.0% by weight of a solvent/carrier comprising water, 3.0-4.5% by weight of a resin/binder, and 57.4-64.8% by weight of filler material. Propellant material is disposed within the main chamber. The propellant material combines with the wall material concentrate to form a contained material. The propellant material comprises substantially within 5-20% by weight of the contained material. An actuator defining an outlet and a button is provided. The actuator is arranged relative to the container assembly such that displacement of the button relative to the valve changes the valve from the closed configuration to the open configuration, thereby allowing a portion of the propellant material to force the contained material out of the main chamber through the outlet. A first portion of the contained material is applied to the anomaly by directing the outlet at the anomaly and displacing the button. The first portion of the contained material is worked to form a base coat that covers the anomaly.

The present invention may also be embodied as a method of covering an anomaly in a wall substantially to match a pre-existing texture pattern surrounding the anomaly comprising the following steps. A container assembly is provided. A valve is supported on the container assembly to define a main chamber, where the valve operates in a closed configuration and an open configuration. Contained material comprising propellant and wall material concentrate is disposed within the main chamber. An actuator defining an outlet and a button is provided. The actuator is arranged relative to the container assembly such that displacement of the button relative to the valve changes the valve from the closed configuration to the open configuration, thereby allowing a portion of the propellant material to force the contained material out of the main chamber through the outlet. A first portion of the contained material is applied to the anomaly to form a base coat by directing the outlet at the anomaly and displacing the button. A second portion of the contained material is applied to the base coat by directing the outlet at the base coat and displacing the button. The second portion of the contained material forms a desired texture pattern on the base coat that substantially matches the pre-existing texture pattern.

DETAILED DESCRIPTION

Figure 1:
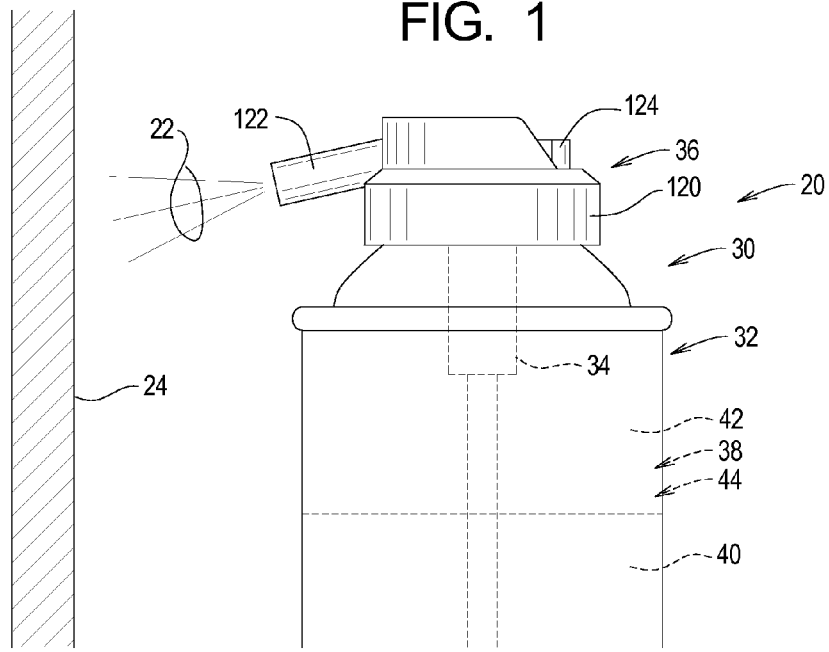
FIG. 1 is a side elevation view of a first example aerosol dispensing system for wall cover material of the present invention being used to apply the wall cover material.
Figure 2:
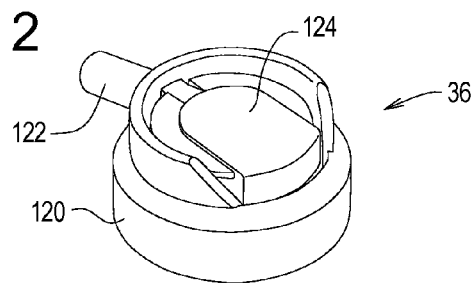
FIG. 2 is a perspective view of a first example actuator that may be employed by the first example aerosol dispensing system.
Figure 3:
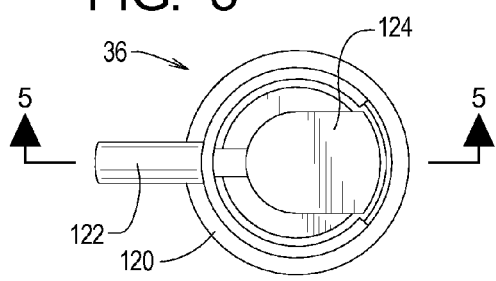
FIGS. 3 and 4 are top and bottom plan views, respectively, of the first example actuator.
Figure 4:
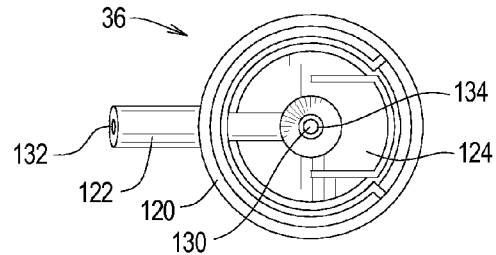
Figure 5:
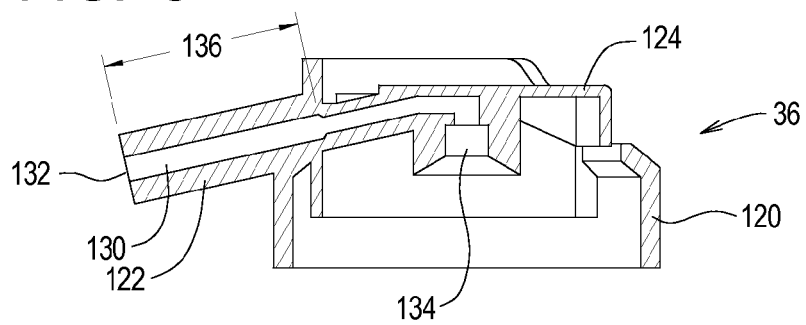
FIG. 5 is a side elevation, sectional view of the first example actuator.

Referring initially to FIG. 1 of the drawing, depicted therein is an example aerosol dispensing system 20 constructed in accordance with, and embodying, the principles of the present invention. As will be described in further detail below, the aerosol dispensing system 20 is adapted to apply wall cover material 22 to a wall surface 24.

Figure 6:
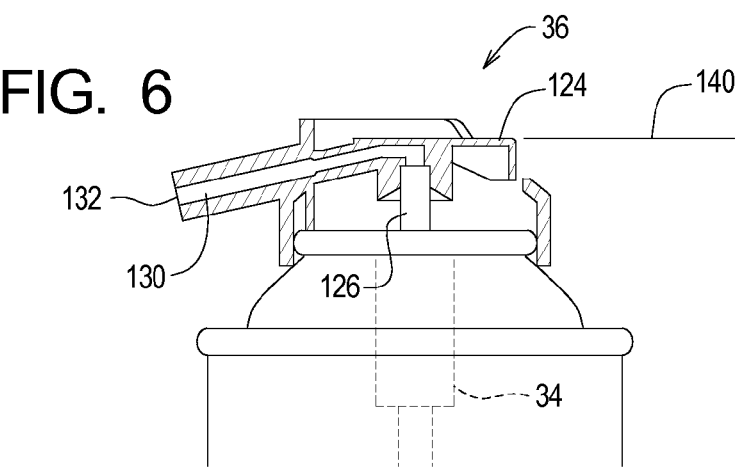
FIG. 6 is a side elevation, sectional view of the first example actuator mounted on a container assembly of the first example aerosol dispensing system.
Figure 7:
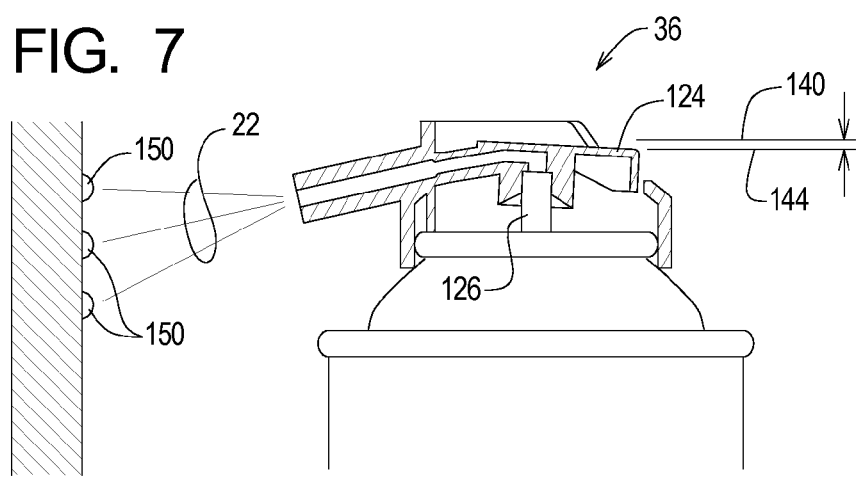
FIG. 7 is a side elevation view similar to FIG. 6 illustrating a first mode of operation of the example aerosol dispensing assembly.
Figure 8:
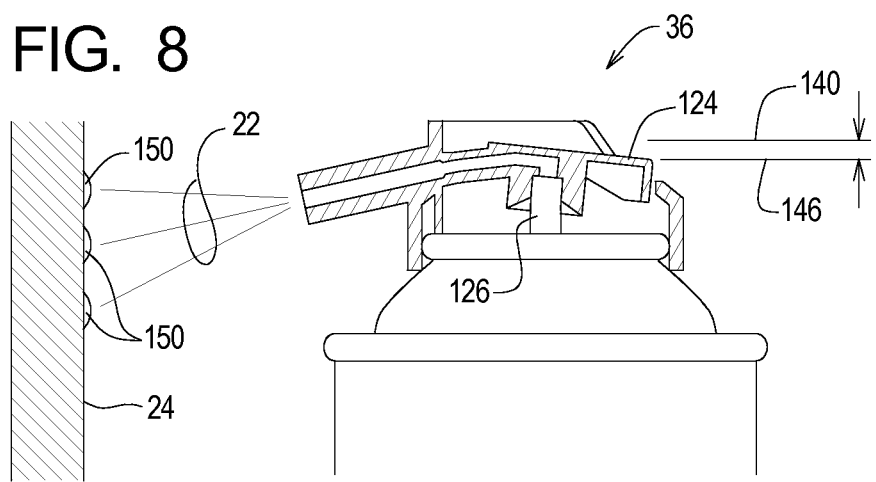
FIG. 8 is a side elevation view similar to FIG. 6 illustrating a second mode of operation of the example aerosol dispensing assembly.
Figure 9:
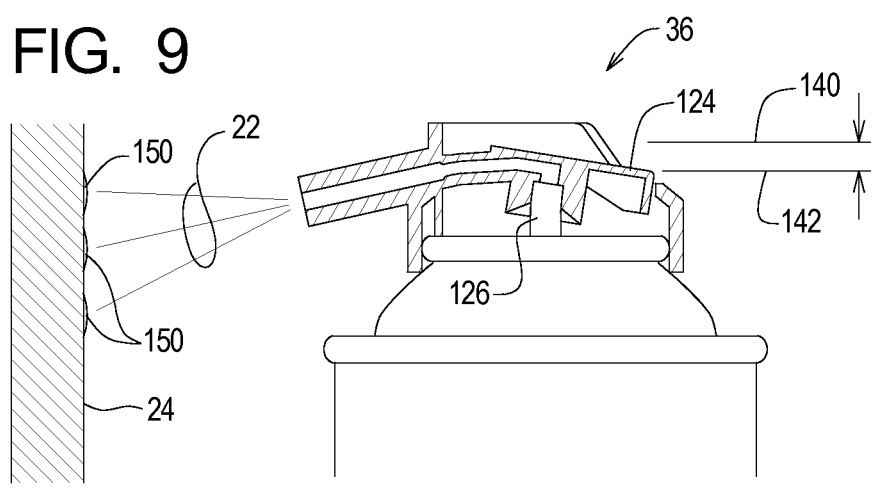
FIG. 9 is a side elevation view similar to FIG. 6 illustrating a third mode of operation of the example aerosol dispensing assembly.
Figure 10A:
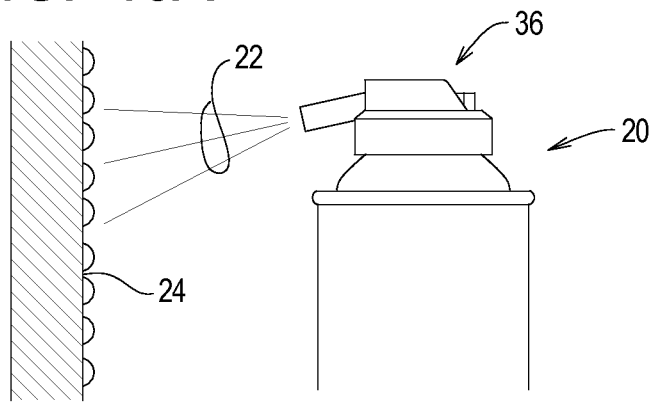
FIGS. 10A-10C illustrate a two step process for repairing a wall surface using the example aerosol dispensing assembly.
Figure 10B:
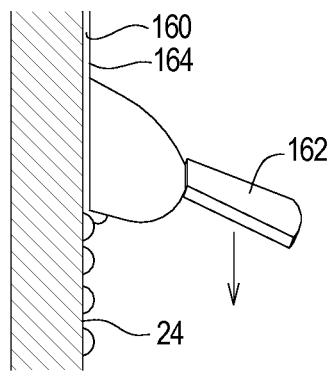
Figure 10C:
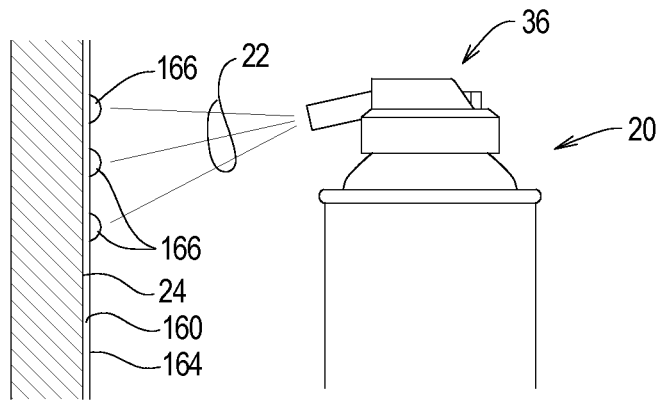
Figure 11A:
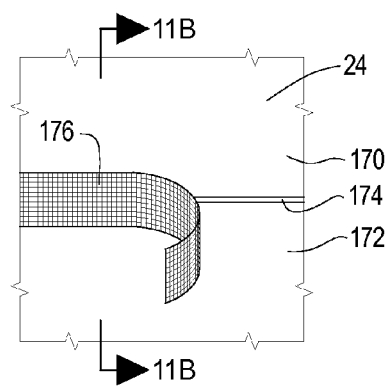
FIGS. 11A, 11B, 11C, and 12 illustrate the process of using the example aerosol dispensing assembly to apply a base coat structure at a seam formed by adjacent wall panels of a wall surface.
Figure 11B:
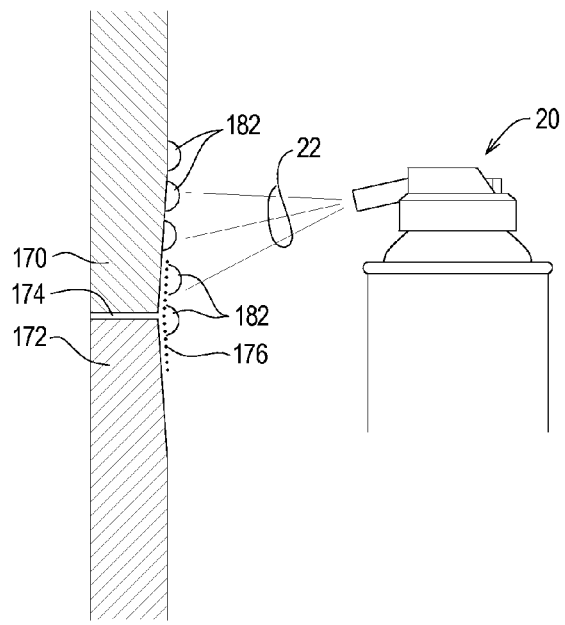
Figure 11C:
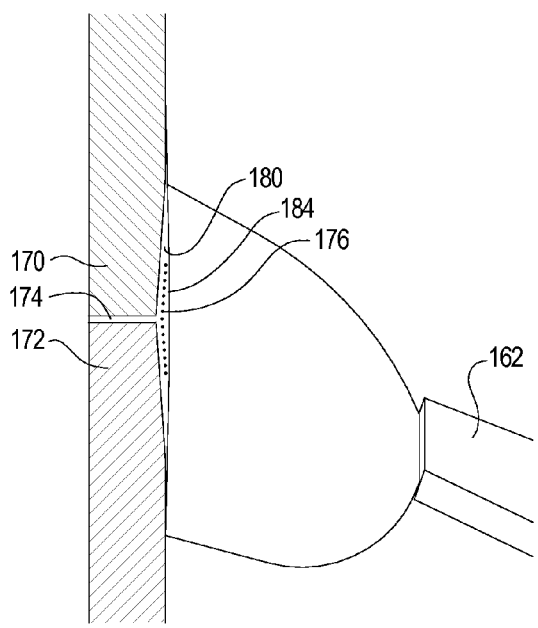
Figure 12:
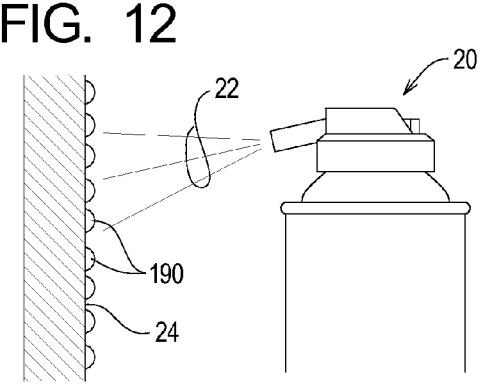
Figure 13:
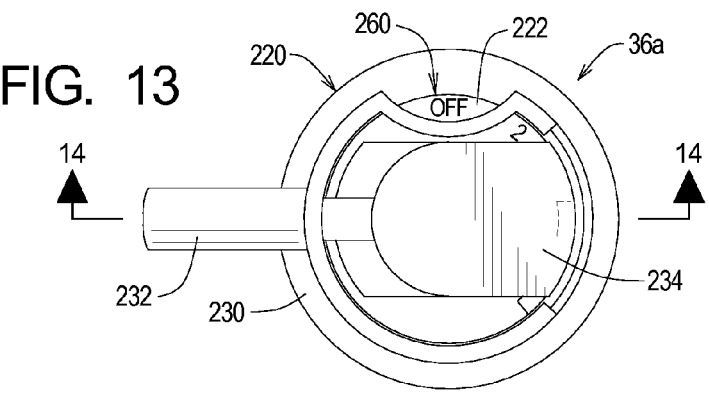
FIG. 13 is a top plan view of a second example actuator that may be employed by the first example aerosol dispensing system.

The example aerosol dispensing system 20 comprises an aerosol assembly 30 comprising a container assembly 32, a valve 34 (FIGS. 1 and 6), and an actuator 36. The container assembly 32 and the valve 34 are or may be conventional and will be described herein only to the extent helpful for a complete understanding of the present invention. When combined to form the aerosol assembly 30, the example container assembly 32 and valve 34 define a main chamber 38.

The main chamber 38 contains a liquid material 40 and a vapor material 42. The liquid material 40 comes into contact with at least a portion of the container assembly 32 and the valve 34. The liquid material 40 comprises texture material and propellant material in liquid form. The vapor material 42 comprises propellant material in vapor form. The liquid material 40 comprises propellant material in liquid form and a texture material concentrate. The combination of the liquid material 40 and the vapor material 42 in the aerosol assembly 30 will be referred to as the contained material 44.

When the valve 34 is in a closed configuration, the flow of fluid out of the main chamber 38 is substantially prevented. However, the vapor material 42 pressurizes the liquid material 40 within the main chamber 38 such that, when the valve 34 is in an open configuration, the vapor material 42 forces the liquid material 40 out of the main chamber 38.

The example texture material concentrate is formulated as described in the following table:

General Example of Wall Cover Material Concentrate

| COMPONENT | FIRST PREFERRED RANGE | SECOND PREFERRED RANGE |
|---|---|---|
| solvent/carrier | 31.5-34.0% | 28.0-38.0% |
| resin/binder | 3.0-4.5% | 2.5-5.0% |
| fillers | 57.4-64.8% | 51.5-71.5% |
| defoamer | 0.15-0.22% | 0.10-0.30% |

The texture material concentrate described in the table set forth above is combined in the container assembly 32 with the propellant material to obtain the contained material 44. The preferred amount of propellant material used to form the example dispensing system 20 is approximately 10.0% of the contained material 44 by weight and is preferably within a first preferred range of 7.5-12.5% by weight of the contained material 44 and is in any event preferably within a second preferred range of 5-20% by weight.

The texture material concentrate is preferably formulated and combined with propellant material as follows. If used, anti-corrosion materials are initially dissolved in the water. The remaining materials are then mixed with the water solution to obtain the wall cover material concentrate. The wall cover material concentrate is introduced into the container assembly 32, and the valve 34 is mounted onto the container assembly 32 to form the aerosol assembly 30. The propellant material is then introduced into the container assembly 32 through the valve 34 to form the dispensing system 20.

With the foregoing general understanding of the present invention, the details of several example formulations of the wall cover material concentrate and the construction and use of the example aerosol dispensing system 20 will now be described in further detail.

Referring now to FIGS. 2-5, it can be seen that the actuator 36 comprises a base 120, an outlet 122, and a button 124. A valve stem 126 (FIG. 6) extends from the valve 34 into the button 124. Optionally, the valve stem 126 may extend from the button 124 into the valve 34.

An actuator passageway 130 between an outlet opening 132 formed in the outlet 122 and a valve opening 134 formed in the button 124. The base 120 is sized and dimensioned to be mounted on the container assembly 32 such that a valve stem 126 extends into the valve opening 134. The outlet 122 defines an elongate outlet portion 136 of the actuator passageway 130.

The button 124 is pivotably supported by the base 120 such that pressing the button 124 causes the button 124 to move relative to the base 120 from an undeformed or proximal position 140 (FIG. 6) to a fully deformed or distal position 142 (FIG. 9).

When button 124 is in the proximal position, the valve stem 126 is in a fully extended position, and the valve 24 is in its closed position. As the button 124 pivots relative to the base 120 from the proximal position to the distal position, the button 124 displaces the valve stem 126, placing the valve 34 in an open configuration. The valve 34 is variable in that, as the valve stem 126 moves from the fully extended position, as size of a valve opening defined by the valve 34 increases. Many conventional aerosol valves operate in this way, and the dispensing system 20 may use any aerosol valve that defines a variable valve opening and can handle the viscosity of the liquid material 40.

The size of the valve opening determines how the liquid material 40 is dispensed by the dispensing system 20. As shown in FIG. 7, when the button 124 is displaced into a first intermediate position 144 between the proximal and distal positions, the valve opening is relatively small, and the liquid material 40 is dispensed in relatively large discrete portions. In particular, the viscosity of the liquid material 40 is such that the vapor material 42 cannot drive the liquid material 40 out of the main chamber 38 in a steady stream, and not much of the propellant is entrained within the dispensed liquid material 40. Accordingly, the wall cover material 22 is deposited on the wall surface 24 in a relatively rough coat of relatively large droplets 150.

As shown in FIG. 8, when the button 124 is displaced into a second intermediate position 146 between the proximal and distal positions, the valve opening is slightly larger, and the liquid material 40 is dispensed in medium-sized discrete portions. In particular, with the valve opening slightly larger, the viscosity of the liquid material 40 is such that the vapor material 42 drives more of the liquid material 40 out of the main chamber 38 in a steady stream, and more of the propellant material is entrained within the dispensed liquid material 40. The entrained propellant material breaks up the liquid material 40 such that the wall cover material 22 is deposited on the wall surface 24 in a medium coat of medium-sized droplets 152.

As shown in FIG. 9, when the button 124 is displaced into the distal position 142, the valve opening is at its largest, and the liquid material 40 is dispensed in relatively small discrete portions. In particular, with the valve opening at its largest, the vapor material 42 drives a relatively large quantity of the liquid material 40 out of the main chamber 38 in a steady stream, with correspondingly more of the propellant material entrained within the stream of dispensed liquid material 40. Accordingly, the increased amount of entrained propellant material tends to atomize the wall cover material 22 such that the wall cover material 22 is deposited on the wall surface 24 in a fine coat of small droplets 154.

FIGS. 10A-10C illustrate one example of how the example dispensing system 20 may be used. Initially, a base coat 160 comprising a relatively large amount of wall cover material 22 is applied to the wall surface 24. The base coat 160 may be formed by continuous application of wall material 22 that builds up to form the base coat 160. Optionally, as shown in FIG. 10B, a tool 162 may be used to work the applied wall cover material 22 to form a relatively smooth surface 164 on the base coat 160.

Other portions of the wall surface 24 may be textured, which defines a pre-existing texture pattern. If so, once the base coat 160 has been formed, a texture coat 166 may be formed on the base coat 160 by again applying the wall cover material 22 to the base coat 160. When forming the texture coat 166, the button 124 is depressed to a desired position between the proximal and distal positions when applying the texture coat 166. In this desired position, the wall cover material 22 is dispensed in droplets sized and dimensioned such that the texture pattern of the applied texture coat 166 substantially matches the pre-existing texture pattern.

The dispensing system 20 thus allows a product to form both the base coat 160 and the texture coat 166. Optionally, the dispensing system 20 may be used to form only the base coat 160 or only the texture coat 166. The dispensing system 20 of the present invention thus provides the user with significant flexibility to perform a wide variety of wall repair functions with a single product.

FIGS. 11A-11C illustrate another example of the use of the dispensing system 20. As shown in FIG. 11A, in this second example of use of the dispensing system 20, the wall surface 24 is formed by first and second wall panels 170 and 172. A gap 174 is formed between the wall panels 170 and 172. Drywall tape 176 is adhered to the wall panels 170 and 172 such that the tape 176 extends across the gap 174.

A base coat 180 is formed by applying a raw layer 182 of the wall cover material 22 to the wall surface 24 over the drywall tape 176. The raw layer 182 is worked with the tool 162 such that the resulting base coat 180 defines a relatively smooth surface 184. The base coat 180 may also be sanded when dry or otherwise worked. A texture coat may or may not be formed on the base coat 180.

FIG. 12 illustrates that the dispensing system 20 may be used to form a texture coat 190 on the wall surface 24 without first forming a base coat using the wall cover material 22.

Referring now to FIGS. 13-20, described therein is a second example actuator **36*a* that may be used in place of the actuator 36** described above.

The second example actuator **36*a* comprises a base member 220 and a stop member 222. The base member 220 comprises a base 230, an outlet 232, and a button 234**.

An actuator passageway 240 between an outlet opening 242 formed in the outlet 232 and a valve opening 244 formed in the button 234. The base 230 is sized and dimensioned to be mounted on the container assembly 32 such that a valve stem extends into the valve opening 244. The outlet 232 defines an elongate outlet portion 246 of the actuator passageway 240.

The stop member 222 defines a main surface 250 and first, second, and third stop surfaces 252, 254, and 256. First, second, third, and fourth indicia 260, 262, 264, and 266 are on the main surface. The first, second, and third indicia 260, 262, and 264 are associated with the first, second, and third stop surfaces 252, 254, and 256, respectively, and the fourth indicia is associated with the main surface 250.

Figure 14:
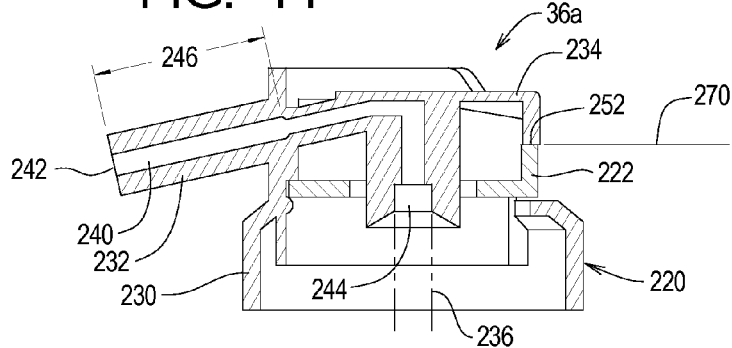
FIG. 14 is a side elevation, sectional view of the second example actuator.
Figure 15:
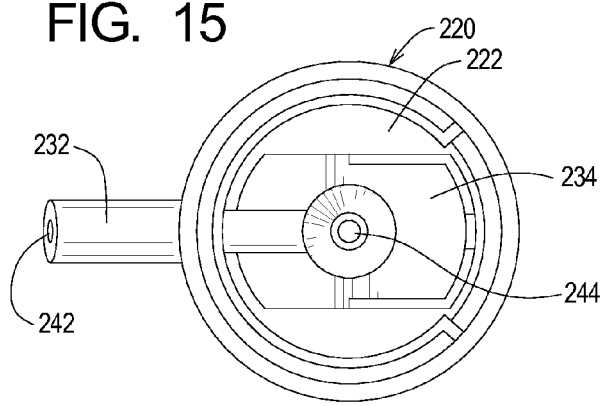
FIG. 15 is a bottom plan view of the second example actuator.
Figure 16:
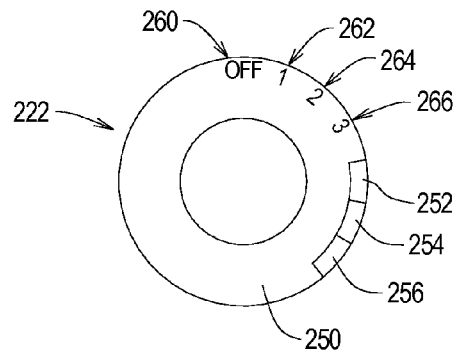
FIG. 16 is a top plan view of a stop member of the second example actuator.
Figure 17:
FIG. 17 is a side elevation view of the stop member depicted in FIG. 16.
Figure 20A:
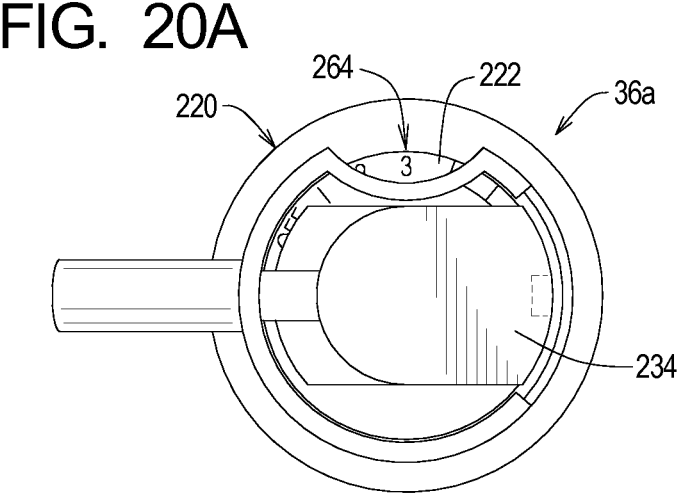
FIGS. 20A and 20B illustrate a third mode of operation of the second example actuator.
Figure 20B:
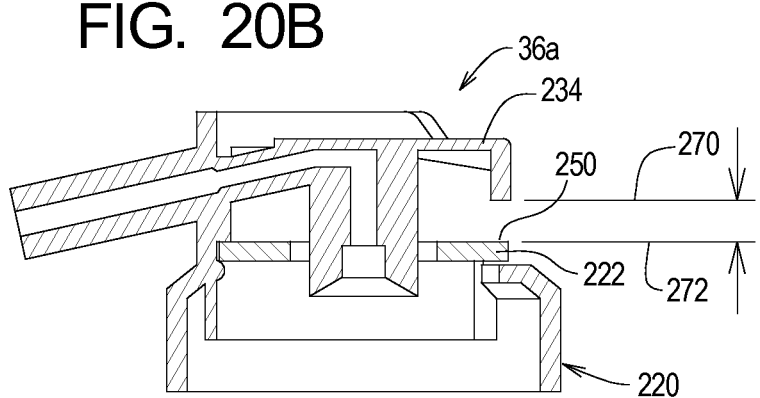

The button 234 is pivotably supported by the base 230 such that pressing the button 234 causes the button 234 to move relative to the base 230 from an undeformed or proximal position 270 (FIG. 14) to a fully deformed or distal position 272 (FIG. 20B).

When button 234 is in the proximal position, the valve stem 236 is in a fully extended position, and the valve 24 is in its closed position. As the button 234 pivots relative to the base 230 from the proximal position to the distal position, the button 234 displaces the valve stem 236, placing the valve 34 in an open configuration. Again, the valve 34 is variable in that, as the valve stem 236 moves from the fully extended position, as size of a valve opening defined by the valve 34 increases. Many conventional aerosol valves operate in this way, and the dispensing system 20 may use any aerosol valve that defines a variable valve opening and can handle the viscosity of the liquid material 40.

Figure 18A:
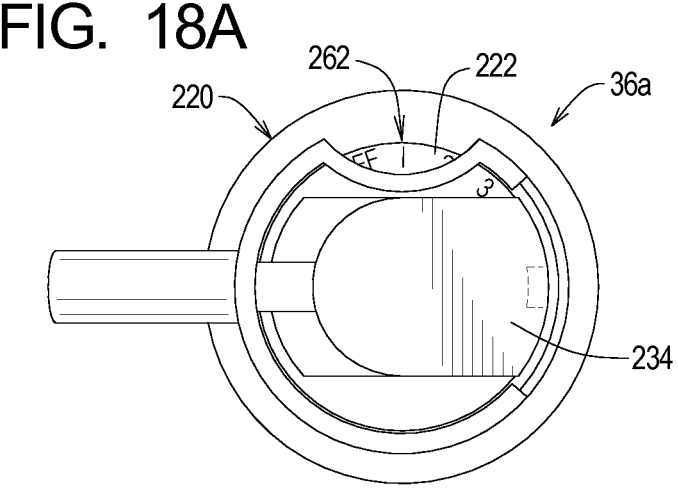
FIGS. 18A, 18B, and 18C illustrate a first mode of operation of the second example actuator.
Figure 18B:
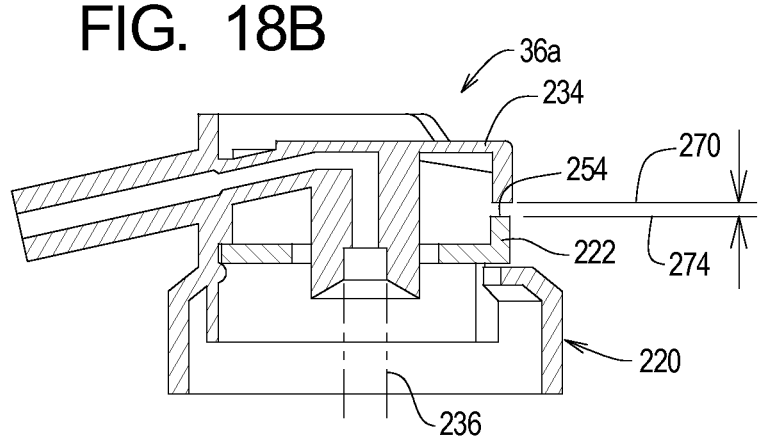
Figure 18C:
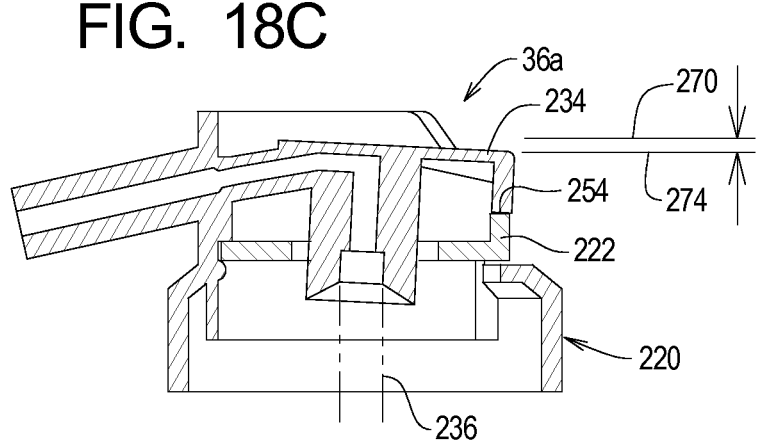

The size of the valve opening determines how the liquid material 40 is dispensed by the dispensing system 20. As shown in FIG. 18C, when the button 234 is displaced into a first intermediate position 274 between the proximal and distal positions, the valve opening is relatively small, and the liquid material 40 is dispensed in relatively large discrete portions. In particular, the viscosity of the liquid material 40 is such that the vapor material 42 cannot drive the liquid material 40 out of the main chamber 38 in a steady stream, and not much of the propellant is entrained within the dispensed liquid material 40. Accordingly, the wall cover material 22 is deposited on the wall surface 24 in a relatively rough coat of relatively large droplets 150.

Figure 19A:
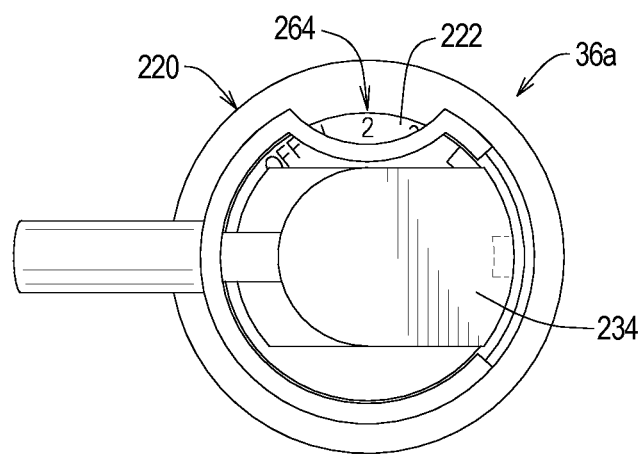
FIGS. 19A and 19B illustrate a second mode of operation of the second example actuator.
Figure 19B:
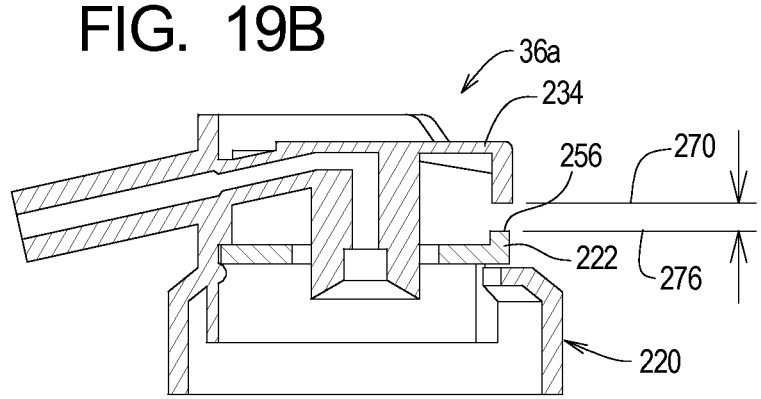

As shown in FIG. 19B, when the button 234 is displaced into a second intermediate position 276 between the proximal and distal positions, the valve opening is slightly larger, and the liquid material 40 is dispensed in medium-sized discrete portions. In particular, with the valve opening slightly larger, the viscosity of the liquid material 40 is such that the vapor material 42 drives more of the liquid material 40 out of the main chamber 38 in a steady stream, and more of the propellant material is entrained within the dispensed liquid material 40. The entrained propellant material breaks up the liquid material 40 such that the wall cover material 22 is deposited on the wall surface 24 in a medium coat of medium-sized droplets 152.

As shown in FIG. 20B, when the button 234 is displaced into the distal position 272, the valve opening is at its largest, and the liquid material 40 is dispensed in relatively small discrete portions. In particular, with the valve opening at its largest, the vapor material 42 drives a relatively large quantity of the liquid material 40 out of the main chamber 38 in a steady stream, with correspondingly more of the propellant material entrained within the stream of dispensed liquid material 40. Accordingly, the increased amount of entrained propellant material tends to atomize the wall cover material 22 such that the wall cover material 22 is deposited on the wall surface 24 in a fine coat of small droplets 154.

The stop member 222 is arranged such that the main surface 250 corresponds to the distal position 272 and the first, second, and third stop surfaces 252, 254, and 256 correspond to the proximal position 270, the first intermediate position 274, and the second intermediate position 276, respectively, of the button 234. In particular, the example stop member 222 is arranged to rotate relative to the base member 220 such that the main surface 250 and the stop surfaces 252, 254, and 256 limit the travel of the button 234 as perhaps best shown by a comparison of FIGS. 18B and 18C.

Figure 21:
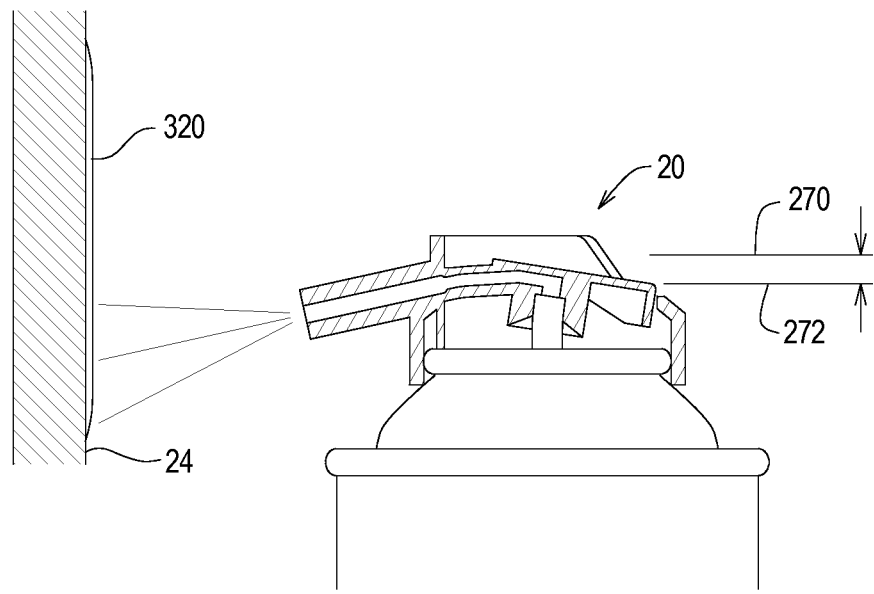
FIG. 21 illustrates the step of applying a base layer using the second example actuator.

FIG. 21 illustrates that the dispensing system 20 may be used to form a thin, relatively smooth cover coat 320. In particular, operating the valve by placing the button in the distal position applies small droplets that accumulate to form a thin, relatively smooth layer.

Figure 22:
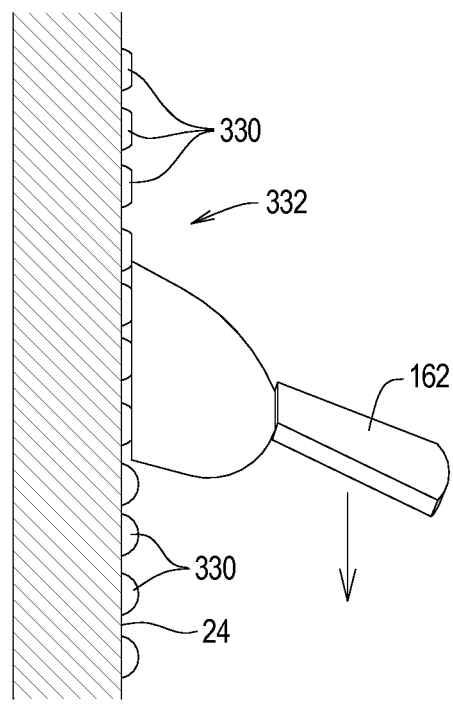
FIG. 22 illustrates the step of forming a knock-down texture using the example aerosol dispensing assembly.
Figure 23A:
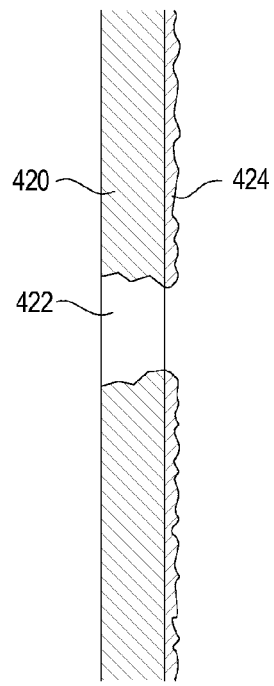
FIGS. 23A-23D illustrate the process of using the example aerosol dispensing assembly to repair a hole in a wall structure.
Figure 23B:
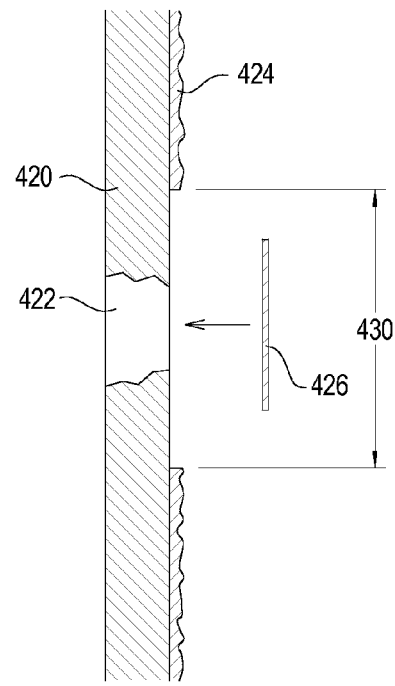
Figure 23C:
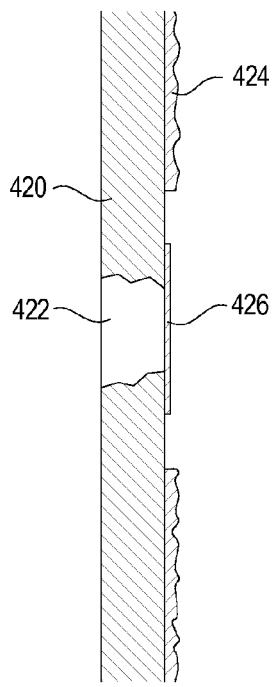
Figure 23D:
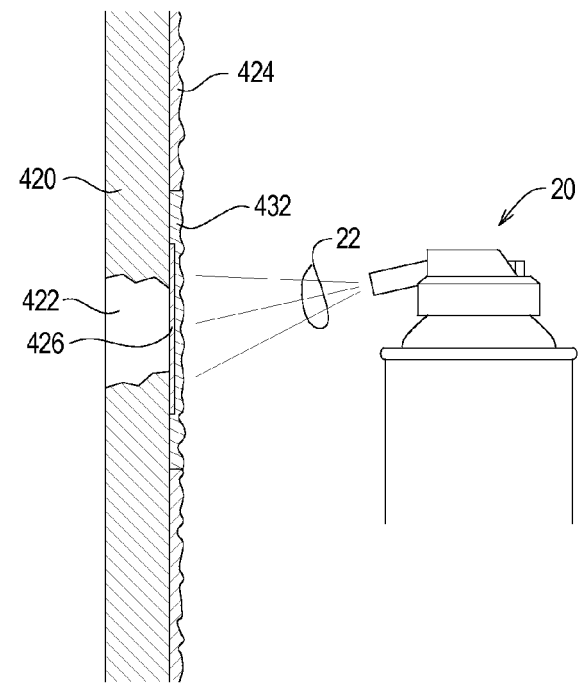

FIG. 22 illustrates that the dispensing system 20 may be used to form what is referred to as a knock down texture pattern. In particular, relatively large droplets 330 have been formed on the wall surface 24, and the tool 162 used to flatten the tops of these droplets 330 to obtain a knockdown texture 332.

FIGS. 23A-23D illustrate that a drywall panel 420 defines a hole 422 to be repaired. Existing texture material 424 defines a pre-existing texture pattern on the panel 420. A patch 426 is to be used to cover the hole 422. The existing texture material 424 may be removed in a repair area indicated by reference character 430. The patch 426 is adhered to the panel 420 over the hole 422. A cover coat 432 is applied to the repair area 430 over the patch 426. The wall repair material 22 dispensed by the system 20 may be applied such that the texture pattern of the cover coat 432 substantially matches the pre-existing texture pattern.

Because at least a portion of the container assembly 32 is metal and thus may be susceptible to corrosion, the wall cover material concentrate is formulated to have anti-corrosion properties. The example wall cover material concentrate thus comprises at least one anti-corrosion material. The anti-corrosion material should be in a first range of approximately 0.5-3.0% by weight and in any event should be in a second range of 0.125-7.0%.

The example wall cover material concentrate comprises first and second anti-corrosion materials. The first anti-corrosion material is in a first preferred range of approximately 0.5-2.0% by weight of the wall cover material concentrate and in any event should be within a second preferred range of approximately 0.1-5.0% by weight. The second anti-corrosion material is in a first preferred range of approximately 0.05-1.0% by weight of the wall cover material concentrate and in any event should be within a second preferred range of approximately 0.025-2.0% by weight.

The example first anti-corrosion material is an anionic, phosphate ester. The first anti-corrosion material is or may be Elfugin, a proprietary product sold by Clariant Paper Chemicals as an antistatic for application to paper products. In the general example described above, approximately 1.00% (±5%) of the first anti-corrosion material is preferably used. The second anti-corrosion material of the example wall cover material concentrate is sodium nitrite. In the general example described above, approximately 0.200% (±5%) of the first anti-corrosion material is preferably used. The exact amount of the first and second anti-corrosion materials depends upon the nature of the remaining components of the wall cover material concentrate and the propellant.

Example of Wall Cover Material Concentrate

When sprayed onto a target surface as will be described in further detail below, the first example wall cover material concentrate forms what is commonly referred to as a "knockdown" spray texture pattern. A knockdown spray texture is formed by a bumpy, irregular texture pattern that is lightly worked with a tool after application to the target surface such that the tops of the bumps formed by the wall cover material are flattened.

| COMPONENT | PREFERRED | FIRST PREFERRED RANGE | SECOND PREFERRED RANGE |
|---|---|---|---|
| solvent/carrier (water) | 32.840% | 31.5-34.0 | 28-38 |
| resin/binder (Wacker RE5028N) | 3.850% | 3.0-4.5 | 2.5-5.0 |
| defoamer (Henkel A-7) | 0.185% | 0.15-0.22 | 0.10-0.30 |
| first anti-corrosion material (Elfugin) | 1.0% | 0.5-1.5% | 0.1-5.0% |
| second anti-corrosion material (NaNo2) | 0.2% | 0.15-0.25 | 0.05-0.35 |
| Biocide (CS1135) | 0.10% | 0.8-0.12 | 0.5-2.0 |
| Thickening Clay (Minugel FG) | 1.370% | 1.2-1.5 | 0.5-2.0 |
| Silica Filler (SilcoSil CT450) | 2.750% | 2.20-3.30 | 1.0-4.5 |
| Calcium Carbonate Filler (Imasco200x CaCO3) | 57.505% | 54.0-60.0 | 50.0-65.0 |
| Shear-sensitive Thickener (Accusol 320 R&H) | 0.2% | 0-0.40 | 0-1.0 |

In the foregoing example, the amounts of the first and second anti-corrosion materials are preferably held to tolerances of substantially ±5% of the amounts specified in the foregoing table.

What is claimed is:

1. A composition for covering an anomaly in a wall substantially to match a pre-existing texture pattern surrounding the anomaly, the composition being adapted to be dispensed from an aerosol assembly operable in closed and open configurations, comprising:
   wall material concentrate comprising:
      28.0-38.0% by weight of a solvent/carrier comprising water,
      3.0-4.5% by weight of a resin/binder,
      57.4-64.8% by weight of filler material, and
      0.5-3.0% by weight of thickener material; and
   propellant material; wherein
   the propellant material is combined with the wall material concentrate within the aerosol assembly to form a contained material;
   the propellant material comprises substantially within 5-20% by weight of the contained material;
   when the aerosol assembly is operated in the open configuration, the propellant material forces the contained material out of the aerosol assembly and onto the surface; and
   a first portion of the contained material on the surface is worked to form a base coat that covers the anomaly; and
   a second portion of the contained material on the surface is applied in a desired texture pattern on the base coat such that the desired texture pattern substantially matches the pre-existing texture pattern.

2. A composition as recited in claim 1, in which the wall material concentrate comprises:
   31.5-34.0% by weight of a solvent/carrier comprising water;
   3.0-4.5% by weight of a resin/binder; and
   57.4-64.8% by weight of filler material.

3. A composition as recited in claim 1, in which the propellant material comprises substantially within 7.5-12.5% by weight of the contained material.

4. A composition as recited in claim 2, in which the propellant material comprises substantially within 7.5-12.5% by weight of the contained material.

5. A method of covering an anomaly in a wall substantially to match a pre-existing texture pattern surrounding the anomaly, the composition adapted being to be dispensed from an aerosol assembly operable in closed and open configurations, comprising:
   providing a wall material concentrate comprising
      28.0-38.0% by weight of a solvent/carrier comprising water,
      3.0-4.5% by weight of a resin/binder, and
      57.4-64.8% by weight of filler material, and
      0.5-3.0% by weight of thickener material; and
   providing propellant material;
   combining the propellant material with the wall material concentrate within the aerosol assembly to form a contained material such that the propellant material comprises substantially within 5-20% by weight of the contained material;
   operating the aerosol assembly in the open configuration such that the propellant material forces the a first portion of the contained material out of the aerosol assembly and onto the surface;
   working the first portion of the contained material on the surface to form a base coat that covers the anomaly;
   operating the aerosol assembly in the open configuration such that the propellant material forces a second portion of the contained material out of the aerosol assembly and onto the base coat to form a repaired surface, where the repaired surface substantially matches the pre-existing texture pattern.

6. A method as recited in claim 5, in which the wall material concentrate comprises:
   31.5-34.0% by weight of a solvent/carrier comprising water;
   3.0-4.5% by weight of a resin/binder; and
   57.4-64.8% by weight of filler material.

7. A method as recited in claim 5, in which the propellant material comprises substantially within 7.5-12.5% by weight of the contained material.

8. A method as recited in claim 6, in which the propellant material comprises substantially within 7.5-12.5% by weight of the contained material.

9. A method as recited in claim 5, further comprising the step of arranging a substrate member over at least a portion of the anomaly prior to the step of applying the first portion of the contained material to the anomaly.

10. A method as recited in claim 9, in which:
   the anomaly is a joint between adjacent drywall sheets; and
   the substrate member is drywall tape.

11. A method as recited in claim 9, in which:
   the anomaly is a hole in a drywall sheet; and
   the substrate member is patch member.

12. A composition as recited in claim 1, in which the wall material concentrate comprises from 0.5-2.0% by weight of the thickening material.

13. A composition as recited in claim 1, in which the thickening material comprises thickening clay.

14. A composition as recited in claim 1, in which the thickening material comprises from 1.2-1.5% by weight of the thickening material.

15. A composition as recited in claim 1, in which the thickening material of the wall material concentrate comprises:
   from 0.5-2.0% by weight of a first thickening material; and
   from 0.0-1.0% by weight of a second thickening material.

16. A composition as recited in claim 1, in which the thickening material of the wall material concentrate comprises:
   a first thickening material comprising a thickening clay; and a second thickening material comprising a shear-sensitive thickener.

17. A composition as recited in claim 1, in which the thickening material of the wall material concentrate comprises:
from 1.2-1.5% by weight of a first thickening material; and
from 0.0-0.4% by weight of a second thickening material.

* * * * *